United States Patent
Hiramori et al.

(10) Patent No.: US 8,733,515 B2
(45) Date of Patent: May 27, 2014

(54) CALIPER BODY FOR DISC BRAKE FOR VEHICLE

(75) Inventors: Yoichi Hiramori, Ueda (JP); Toshihiro Kusano, Ueda (JP)

(73) Assignee: Nissin Kogyo Co., Ltd., Ueda-shi (JP)

( * ) Notice: Subject to any disclaimer, the term of this patent is extended or adjusted under 35 U.S.C. 154(b) by 174 days.

(21) Appl. No.: 13/201,376

(22) PCT Filed: Feb. 10, 2010

(86) PCT No.: PCT/JP2010/051925
§ 371 (c)(1),
(2), (4) Date: Aug. 12, 2011

(87) PCT Pub. No.: WO2010/092967
PCT Pub. Date: Aug. 19, 2010

(65) Prior Publication Data
US 2011/0290600 A1 Dec. 1, 2011

(30) Foreign Application Priority Data
Feb. 12, 2009 (JP) ................................ 2009-029348

(51) Int. Cl.
*F16D 65/20* (2006.01)
*F16D 65/16* (2006.01)
*F16D 55/224* (2006.01)

(52) U.S. Cl.
USPC ... 188/106 P; 188/72.4; 188/72.5; 188/73.31; 188/73.34; 188/73.43; 188/188; 188/73.44; 188/106 R; 188/345

(58) Field of Classification Search
USPC ........ 188/106 R, 106 P, 72.44, 344, 345, 352, 188/354, 1.11 W, 162, 72.5, 72.4, 73.31, 188/73.34, 73.35, 250 E; 303/2, 9.64, 113.5
See application file for complete search history.

(56) References Cited

U.S. PATENT DOCUMENTS

| 3,734,248 | A | * | 5/1973 | Fay | ............................... | 188/345 |
| 2008/0236961 | A1 | * | 10/2008 | Toyoda | ..................... | 188/106 R |
| 2009/0071767 | A1 | | 3/2009 | Bass et al. | | |

FOREIGN PATENT DOCUMENTS

| CN | 2729419 Y | 9/2005 |
| CN | 101363487 A | 2/2009 |

(Continued)

OTHER PUBLICATIONS

International Search Report for PCT/JP2010/051925, mailing date of Mar. 9, 2010.

(Continued)

*Primary Examiner* — Robert A Siconolfi
*Assistant Examiner* — San Aung
(74) *Attorney, Agent, or Firm* — Westerman, Hattori, Daniels & Adrian, LLP (57) ABSTRACT

There is provided a caliper body for a two system-type disc brake for a vehicle, which is reduced in size and has an improved air bleeding property by employing a simple structure. In the caliper body for the two-system disc brake for the vehicle, a communication path, which connects cylinder holes for a first brake system, and a first bleeder hole are formed rectilinearly on an outside, in a disc radius direction, of an imaginary line IL1 which rectilinearly connects inner edges, in the disc radius direction, of cylinder holes for a first brake system and a cylinder hole for a second brake system is provided on an outside, in the disc radius direction, of the communication path.

6 Claims, 5 Drawing Sheets

(56) References Cited

FOREIGN PATENT DOCUMENTS

| JP | 4-7739 U | | 1/1992 |
|---|---|---|---|
| JP | 5-79071 U | | 10/1993 |
| JP | 10-030660 A | | 2/1998 |
| JP | 2003-148524 A | | 5/2003 |
| JP | 2003-166566 A | | 6/2003 |
| JP | 2006-153264 A | | 6/2006 |
| JP | 2007146955 A | * | 6/2007 |
| JP | 2008-240862 A | | 10/2008 |
| JP | 2009236250 A | * | 10/2009 |
| TW | M343636 U | | 11/2008 |

OTHER PUBLICATIONS

Japanese Office Action dated Apr. 19, 2011, issued in corresponding Japanese Patent Application No. 2009-029348, with English translation (4 pages).

Chinese Office Action dated Dec. 5, 2012, issued in corresponding Chinese Patent Application No. 201080007585, with English translation (10 pages).

Taiwanese Office Action dated Oct. 27, 2012, issued in corresponding Taiwanese Patent Application No. 099104677, with English translation (6 pages).

* cited by examiner

FIG.1

1:disk brake
5:slide pin
9,10,11:cylinder hole
9a:10a,11a:piston seal groove

CALIPER BODY FOR DISC BRAKE FOR VEHICLE

TECHNICAL FIELD

The present invention relates to a caliper body for a vehicle disc brake mounted to a vehicle such as a four-wheeled vehicle and a motorcycle and particularly to a caliper body for a two-system pin slide type disk brake for a vehicle in which a plurality of cylinder holes provided in an action portion are divided into two fluid pressure systems.

BACKGROUND ART

In a two-system caliper body in which the plurality of cylinder holes are divided into two fluid pressure systems, the plurality of cylinder holes are arranged in a disc circumferential direction, at least any two of the cylinder holes are formed as the cylinder holes for a first brake system, the other are formed as the cylinder holes for a second brake system, at least one cylinder hole for the second brake system is disposed between the two cylinder holes for the first brake system, the two cylinder holes for the first brake system are formed to be deep, the cylinder hole for the second brake system at the central portion is formed to be shallow, and a communication path for connecting the two cylinder holes for the first brake system is formed in a bottom wall of the shallow cylinder hole (see Patent Document 1, for example). There is another caliper body in which a first fluid passage for supplying hydraulic fluid to pistons inserted into cylinder holes for a first brake system and a second fluid passage for supplying hydraulic fluid to a piston inserted into a cylinder hole for a second brake system are formed rectilinearly (see Patent Document 2, for example).

PRIOR-ART DOCUMENTS

Patent Documents

Patent Document 1: Japanese Utility Model Application Laid-Open No. 5-79071
Patent Document 2: Japanese patent Application Laid-Open No. 2006-153264

SUMMARY OF THE INVENTION

Problem to be Solved by the Invention

In the caliper body shown in the above-described Patent Document 1, however, the two cylinder holes for the first brake system are formed to be deep to secure a space for providing the communication path on a side of bottom portions of the cylinder holes in the caliper body, which increases the caliper body in size. In the Patent Document 2 in which two rectilinear fluid passages bypassing the central cylinder hole and passing through the opposite cylinder holes are connected to form the first fluid passage, the number of man-hours for machining increases and the caliper body increases in size in a disc radius direction. If a fluid passage rectilinearly passes through inner edges, in a disc radius direction, of the opposite cylinder holes and a bleeder hole is formed in one end portion which is open in an outer face of a caliper body, an air bleeding property of the cylinder holes is not satisfactory in air bleeding in a mounted state to a vehicle body in which the bleeder hole is facing upward.

Therefore, it is an object of the present invention to provide a caliper body for a two system-type disc brake for a vehicle, which is reduced in size and has an improved air bleeding property by employing a simple structure.

SUMMARY OF THE INVENTION

To achieve the above object, a caliper body for a disc brake for a vehicle according to the present invention is a caliper body for the two system-type disc brake for the vehicle, in which three or more cylinder holes are arranged in a disc circumference direction in an action portion disposed at a side portion of a disc rotor, at least two of the cylinder holes are formed as cylinder holes for a first brake system and the other cylinder hole (s) is (are) formed as (a) cylinder hole (s) for a second brake system, at least one cylinder hole for the second brake system is disposed between the two cylinder holes for the first brake system, the plurality of cylinder holes for the first brake system are connected by a communication path, pistons inserted into the cylinder holes for the first brake system are actuated by hydraulic fluid supplied through a first fluid passage, the piston (s) inserted into the cylinder hole (s) for the second brake system is (are) actuated by hydraulic fluid supplied through a second fluid passage, a first union hole and a first bleeder hole are open in the first fluid passage, and a second union hole and a second bleeder hole are open in the second fluid passage. The communication path and the first bleeder hole are formed rectilinearly on an outside, in a disc radius direction, of an imaginary line which rectilinearly connects inner edges, in the disc radius direction, of the plurality of cylinder holes for the first brake system, and the cylinder hole (s) for the second brake system is (are) provided on an outside, in the disc radius direction, of the communication path.

Preferably, the caliper body is supported to be movable in a direction of a disc shaft on a caliper bracket mounted to a vehicle body through a pair of slide pins provided on a disc rotation output side and a disc inner periphery side in forward traveling of the vehicle and the slide pin on the disc inner periphery side is disposed at such a position that an imaginary line which rectilinearly connects inner edges, in the disc radius direction, of cylinder portions having, inside themselves, the plurality of cylinder holes for the first brake system passes through a section of the slide pin or disposed on an outside, in the disc radius direction, of the imaginary line.

In a caliper body for the two system-type disc brake for the vehicle, three cylinder holes are arranged in a disc circumference direction in an action portion disposed at a side portion of a disc rotor, two of the cylinder holes disposed on a disc rotation input side and a disc rotation output side in forward traveling of the vehicle are formed as cylinder holes for a first brake system and the central cylinder hole is formed as a cylinder hole for a second brake system, the two cylinder holes for the first brake system are connected by a communication path, pistons inserted into the cylinder holes for the first brake system are actuated by hydraulic fluid supplied through a first fluid passage, the piston inserted into the cylinder hole for the second brake system is actuated by hydraulic fluid supplied through a second fluid passage, a first union hole and a first bleeder hole are open in the first fluid passage, and a second union hole and a second bleeder hole are open in the second fluid passage. The caliper body includes the action portion disposed at one side portion of the disc rotor, a reaction portion disposed on the other side portion of the disc rotor, and a bridge portion connecting the reaction portion and the action portion astride an outer periphery of the disc rotor, the communication path and the first bleeder hole are formed rectilinearly on an outside, in a disc radius direction, of an imaginary line which rectilinearly connects inner edges, in the disc radius direction, of the two cylinder holes for the first brake system, and the cylinder hole for the second brake system is provided on an outside, in the disc radius direction, of the communication path.

Effects of the Invention

With the caliper body for the disc brake for the vehicle according to the invention, the communication path and the first bleeder hole are formed on a straight line. Therefore, the number of man-hours for machining can be reduced and the cost can be reduced. The communication path is formed on the outside, in the disc radius direction, of the imaginary line which rectilinearly connects the inner edges, in the disc radius direction, of the cylinder holes for the first brake system and the cylinder hole for the second brake system is provided on the outside, in the disc rotor radius direction, of the communication path. As a result, it is possible to reduce the caliper body in size without impairing the air bleeding property in the cylinder holes.

The slide pin on the disc inner periphery side and for mounting the caliper body to the caliper bracket is disposed at such a position that the imaginary line which rectilinearly connects inner edges, in the disc radius direction, of cylinder portions having, inside themselves, the plurality of cylinder holes for the first brake system passes through the section of the slide pin. As a result, it is possible to further reduce the caliper body in size.

BRIEF DESCRIPTION OF THE INVENTION

MODE FOR CARRYING OUT THE INVENTION

A disc brake 1 in a present embodiment is for a front brake of a motorcycle and includes a caliper bracket 3 secured to a vehicle body at a side portion of a disc rotor 2, a caliper body 6 supported on the caliper bracket 3 by a pair of slide pins 4 and 5, and a pair of friction pads 7 and 8 disposed to face each other on opposite sides of the disc rotor 2. An arrow A designates a rotating direction of the disc rotor 2 which rotates integrally with a front wheel when the vehicle travels forward and a disc rotation output side and a disc rotation input side described below are in the forward traveling of the vehicle.

The caliper body 6 includes an action portion 6a and a reaction portion 6b disposed on the opposite sides of the disc rotor 2 and a bridge portion 6c connecting the action portion 6a and the reaction portion 6b astride an outer periphery of the disc rotor 2 and is of a three-pot two system-type in which three cylinder holes 9, 10, and 11 formed in the action portion 6a are divided into two fluid pressure systems. The cylinder holes 9, 10, and 11 are arranged and open on a disk rotor side in the action portion 6a and four reaction force claws 6d are formed in the reaction portion 6b. Guide arms 6e, 6e of a hanger pin 12 for hanging the friction pads 7 and 8 are formed to protrude from disc rotor rotation input sides of the action portion 6a and the reaction portion 6b and mounting arms 6f and 6g of the slide pins 4 and 5 are formed to extend from the disk rotation output side and a disc inner periphery side of the action portion 6a, respectively.

The cylinder hole 9 on the disc rotation output side and the cylinder hole 11 on the disc rotation input side are formed on an inner side in the disc radius direction and the central cylinder hole 10 is formed on an outer side in the disc radius direction. In other words, a length L3 from a center P1 of the disc rotor 2 to a central axis C3 of the cylinder hole 10 is greater than a length L1 from the center P1 to a central axis C1 of the cylinder hole 9 and a length L2 from the center P1 to a central axis C2 of the cylinder hole 11. Furthermore, the central cylinder hole 10 and the cylinder hole 11 on the disc rotation input side are formed to have smaller diameters and the cylinder hole 9 on the disc rotation output side is formed to have a larger diameter. The cylinder hole 9 on the disc rotation output side and the cylinder hole 11 on the disc rotation input side are formed to have equal depths and the central cylinder hole 10 is formed to be deeper than the cylinder hole 9 on the disc rotation output side and the cylinder hole 11 on the disc rotation input side. The large-diameter cylinder hole 9 formed on the disc rotation output side and on the inner side in the disc radius direction and the small-diameter cylinder hole 11 formed on the disc rotation input side and on the inner side in the disc radius direction are used as cylinder holes for a first brake system and the small-diameter cylinder hole 10 formed at the center in the disk circumference direction between these cylinder holes 9 and 11 for the first brake system and on the outer side in the disc radius direction and formed to be deeper than the other two cylinder holes 9 and 11 are used as a cylinder hole for a second brake system. A cylinder hole bottom portion side of the caliper body 6 is formed in a stepped shape having a protruding portion 6h on an outside, in the disc radius direction, of a central portion, because the central cylinder hole 10 is formed on the outside, in the disc radius direction, of the other cylinder holes 9 and 11 and formed to be deeper than the other cylinder holes 9 and 11.

A large-diameter piston 13 is inserted into the cylinder hole 9 on the disc rotation output side with a piston seal 14 and a dust seal 15 interposed therebetween and a small-diameter piston 16 having the same length as the piston 13 is inserted into the cylinder hole 11 on the disc rotation input side with a piston seal 17 and a dust seal 18 interposed therebetween. A small-diameter piston 19 longer than the pistons 13 and 16 is inserted into the central cylinder hole 10 with a piston seal 20 and a dust seal 21 interposed therebetween. The respective piston seals 14, 17, and 20 and dust seals 15, 18, and 21 are respectively mounted in piston seal grooves 9a, 10a, and 11a and dust seal grooves 9b, 10b, and 11b formed in the cylinder holes 9, 10, and 11, the piston seal groove 10a in the central cylinder hole 10 is formed at a longer distance from the disk rotor than the piston seal grooves 9a and 11a in the other two cylinder holes 9 and 11. The piston seal grooves 9a and 10a and the piston seal grooves 10a and 11a adjacent to each other in the disc circumference direction are formed at positions displaced from each other in a disk axial direction and formed while overlapping each other in the disk circumference direction. The dust seal grooves 9b, 10b, and 11b are formed to be shallower than the piston seal grooves 9a, 10a, and 11a and are formed on opening sides of the cylinder holes 9, 10, and 11, respectively.

Between the respective pistons 13, 19, and 16 and the respective cylinder holes 9, 10, and 11, fluid pressure chambers 22a, 22b, and 22c are formed respectively. The fluid pressure chambers 22a and 22c respectively formed between the cylinder holes 9 and 11 on the disk rotation output side and input side and serving as the cylinder holes for the first brake system and the pistons 13 and 16 are connected by a communication path 23a of a first fluid passage 23.

A first union boss portion 6i protrudes on an outside side, in the disc radius direction, of the action portion 6a and on the disc rotation output side and a first bleeder boss portion 6j protrudes on an inside in the disc radius direction and from an end portion on the disc rotation output side, respectively. A second union boss portion 6k and a second bleeder boss portion 6m respectively protrude on the outer side in the disc radius direction and from a central portion in the disc circumferential direction.

The first fluid passage 23 includes a first union hole 6n formed in the first union boss portion 6i and communicating with the cylinder hole 9 on the disc rotation output side, a first bleeder hole 6o formed in the first bleeder boss portion 6j and communicating with the cylinder hole 9 on the disc rotation output side, and the communication path 23a formed rectilinearly from the first bleeder hole 6o, passing on an inside, in the disc radius direction, of the central cylinder hole 10, and rectilinearly connecting the cylinder hole 9 on the disc rotation output side and the cylinder hole 11 on the disc rotation input side. A second fluid passage 24 includes a second union hole 6p formed in the second union boss portion 6k and communicating with the central cylinder hole 10 and a second bleeder hole 6q formed in the second bleeder boss portion 6m and communicating with the central cylinder hole 10. Bleeder screws 25 and 26 are screwed into the first bleeder hole 6o and the second bleeder hole 6q, respectively.

The communication path 23a of the first fluid passage 23 is formed rectilinearly on the outside, in the disc radius direction, of an imaginary line IL1 which rectilinearly connects the inner edges, in the disc radius direction, of the cylinder hole 9 on the disc rotation output side and the cylinder hole 11 on the disc rotation input side and the communication path 23a and the first bleeder hole 6o are formed on a straight line. The communication path 23a and the first bleeder hole 6o are formed by simultaneously boring them from an opening portion of the first bleeder hole 6o to a face, on the disc rotation output side, of the cylinder hole 11 through the cylinder hole 13. Moreover, an internal thread portion into which a bleeder screw 25 is screwed is formed in the opening portion of the first bleeder hole 6o. The central cylinder hole 10 is disposed on the outer side, in the disc radius direction, of the first fluid passage 23.

The caliper bracket 3 is a plate-shaped member mounted to a bottom case and includes a first mounting portion 3a protruding on the disc rotation output side and on the disc outer periphery side of the caliper body 6 and a second mounting portion 3b disposed on the disc inner periphery side of the caliper body 6. On action portion sides of the first mounting portion 3a and the second mounting portion 3b, the slide pins 4 and 5 are formed to protrude parallel to a disc shaft. The slide pin 4 on the disc rotation output side is inserted into an insertion hole formed in a mounting arm 6t on the disc rotation output side and the slide pin 5 on the disc inner periphery side is inserted into an insertion hole formed in a mounting arm 6g on the disc inner periphery side, respectively. The caliper body 6 is supported by these slide pins 5 to be movable in a direction of the disc shaft.

The slide pin 4 on the disc rotation output side is formed to protrude parallel to the disc shaft on the action portion side of the caliper bracket 3 by inserting an external thread portion of the slide pin 4 through a through hole in the caliper bracket from the action portion side of the caliper bracket 3, bringing a flange portion 4a into contact with a side face of the action portion of the caliper bracket 3, screwing a sleeve nut 4b over the external thread portion protruding from the through hole to the reaction portion side, and sandwiching the caliper bracket 3 between the sleeve nut 4b and the flange portion 4a of the slide pin 4.

The slide pin 5 on the disc inner periphery side includes a shaft portion 5a inserted into the insertion hole in the mounting arm 6g, an external thread 5b used for mounting to the caliper bracket 3, and a hexagonal nut 5c formed between the external thread 5b and the shaft portion 5a. The slide pin 5 is provided to protrude parallel to the disc shaft on the action portion side of the caliper bracket 3 by screwing the external thread 5b into an internally threaded hole in the caliper bracket 3 from the action portion side and bringing the nut 5c into contact with a side face of the action portion of the caliper bracket 3. The slide pin 5 mounted in this manner is disposed at such a position that an imaginary line IL2 which rectilinearly connects inner edges, in the disc radius direction, of cylinder portions 6r and 6s of the caliper body 6 having, inside themselves, the cylinder hole 9 on the disc rotation output side and the cylinder hole 11 on the disc rotation input side passes through a section of the slide pin 5.

The hanger pin 12 is provided on the guide arms 6e, 6e astride the outside of the disc rotor 2 to be parallel to the disc shaft. Disc rotation input sides of the friction pads 7 and 8 are hung on the hanger pin 12 and disc rotation output sides of the friction pads 7 and 8 are supported on the caliper bracket 3 and the sleeve nut 4b, respectively.

The friction pads 7 and 8 are formed by securing linings 7a and 8a in sliding contact with side faces of the disc rotor 2 to one side faces of back plates 7b and 8b and arm portions 7c and 8c in which hanger pin insertion holes are formed protrude from disc rotation input sides of the back plates 7b and 8b. Torque transmitting arms 7d and 8d are provided to disc rotation output sides of the back plates 7b and 8b and a bifurcated chip 8e in a shape of a half arc is provided to a tip end of the torque transmitting arm 8d on the reaction portion side. The friction pad 7 on the action portion side is hung by inserting the hanger pin 12 through the hanger pin insertion hole on the disc rotation input side, the torque transmitting arm 7d on the disc rotation output side is supported on the caliper bracket 3, and the friction pad 7 is disposed to be movable in the direction of the disc shaft between the pistons 13, 16, and 19 and a one side face of the disc rotor 2. The friction pad 8 on the reaction portion side is hung by inserting the hanger pin 12 through the hanger pin insertion hole on the disc rotation input side, the bifurcated chip 8e at the tip end of the torque transmitting arm 8d on the disc rotation output side surrounds substantially a half of a circumference of the sleeve nut 4b, and the friction pad 8 is disposed to be movable in the direction of the disc shaft between the reaction force claws 6d and the other side face of the disc rotor 2.

Figure 1:
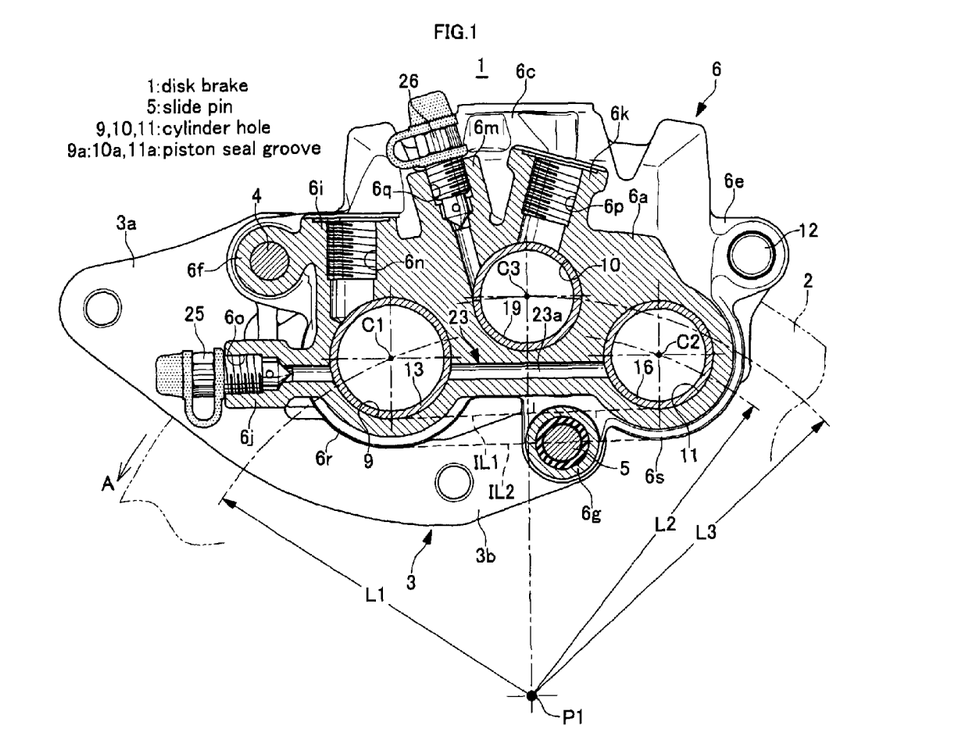
FIG. 1 is a sectional view along a line I-I in FIG. 4.
Figure 2:
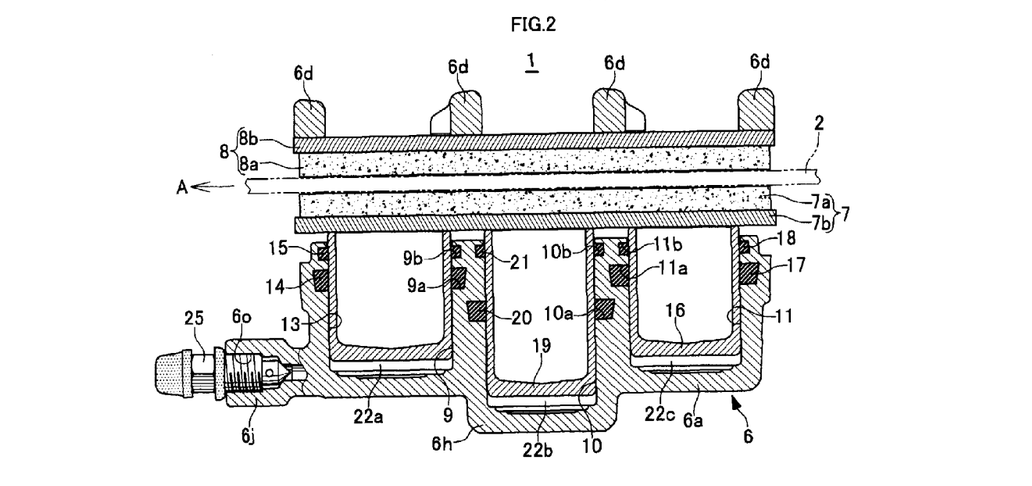
FIG. 2 is a sectional view along a line II-II in FIG. 3.
Figure 3:
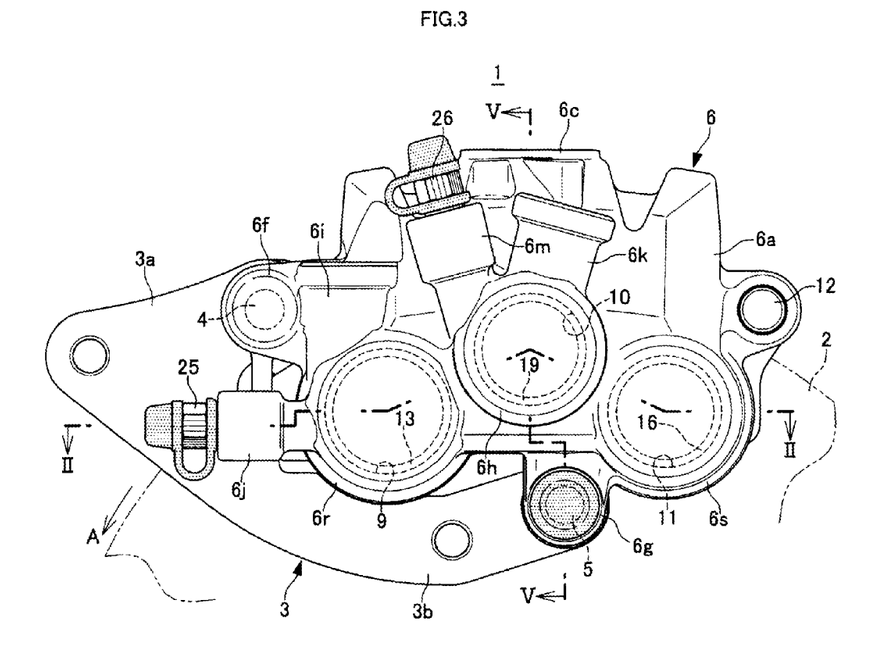
FIG. 3 is a front view of a disc brake for a vehicle and showing an embodiment of the present invention.
Figure 4:
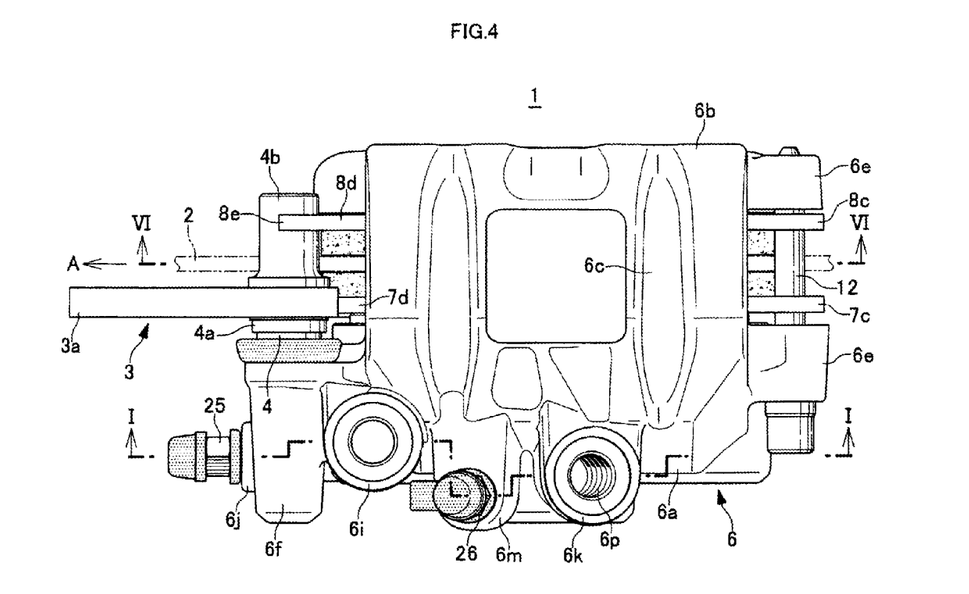
FIG. 4 is a plan view of the disc brake for the vehicle and showing the embodiment of the invention.
Figure 5:
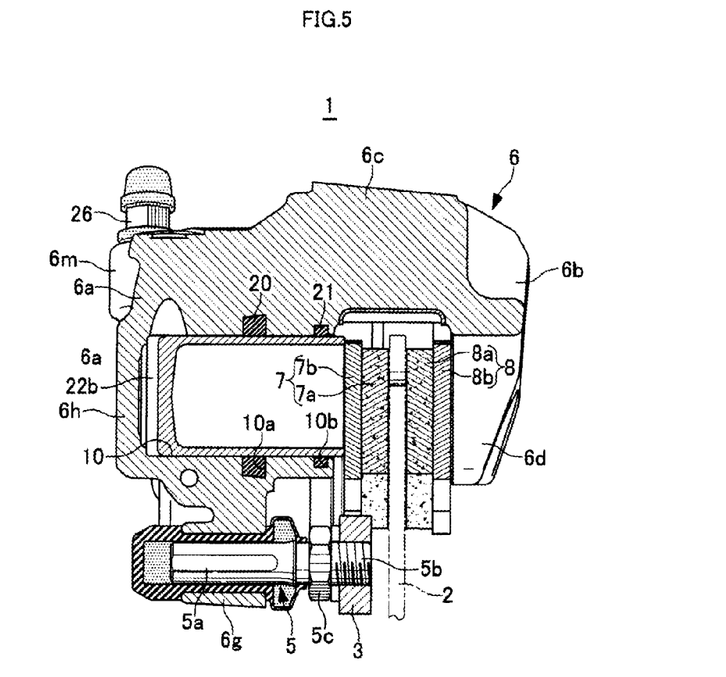
FIG. 5 is a sectional view along a line V-V in FIG. 3.
Figure 6:
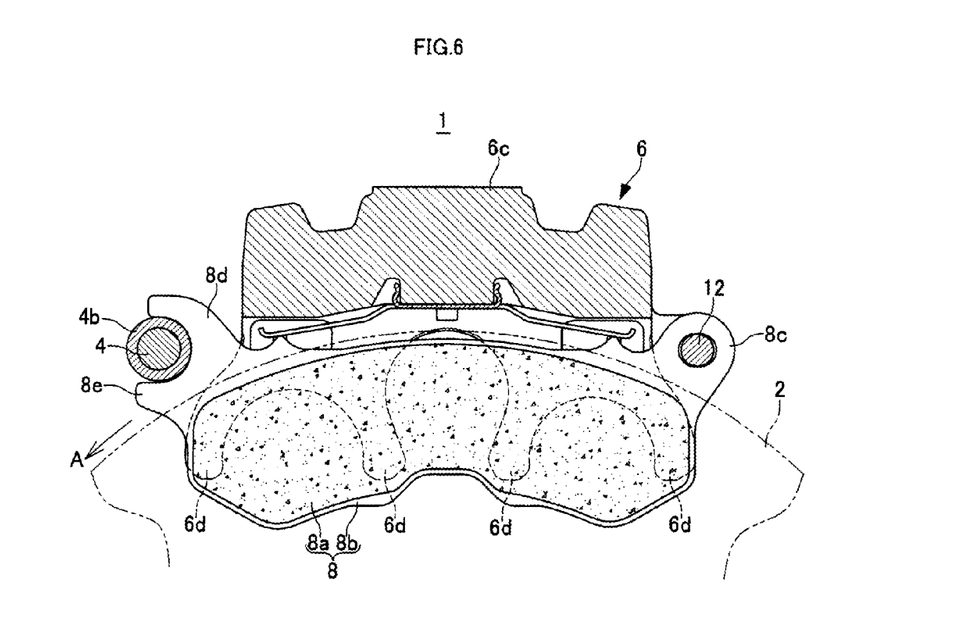
FIG. 6 is a sectional view along a line VI-VI in FIG. 4.
Figure 7:
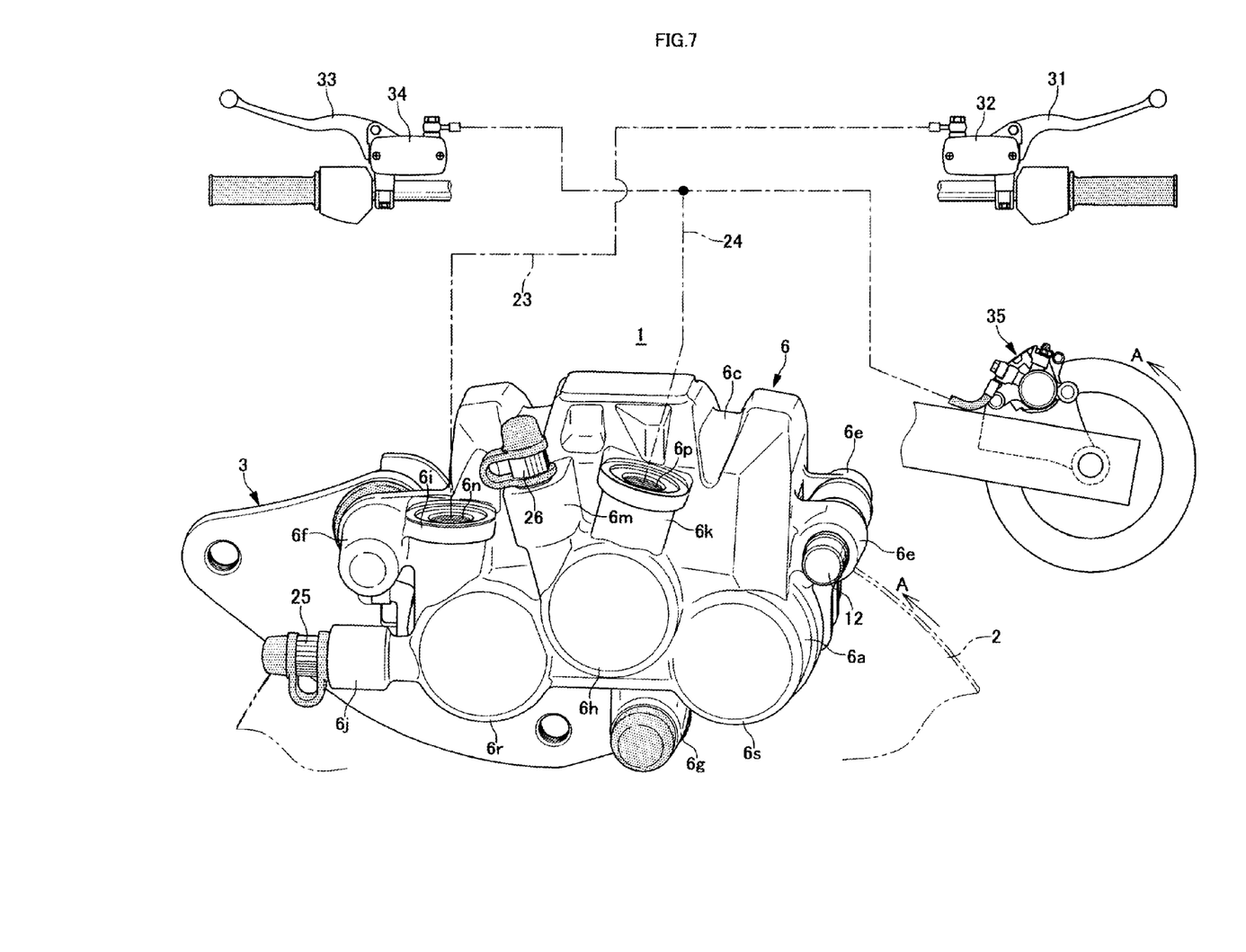
FIG. 7 is a system diagram of a brake device and showing the embodiment of the invention.

The two fluid passages 23 and 24 communicate with known fluid pressure master cylinders through brake hoses (not shown) connected to the respective union holes 6n and 6p. For example, as shown in FIG. 7, the first fluid passage 23 is connected to the first fluid pressure master cylinder 32 for generating fluid pressure by operation of a brake lever 31 of a front wheel brake and the second fluid passage 24 is connected to the second fluid pressure master cylinder 34 for generating fluid pressure by operation of a brake lever 33 of a rear wheel brake.

If the brake lever 31 for the front wheel is operated, fluid pressure generated in the first fluid pressure master cylinder 32 is introduced into the fluid pressure chambers 22a and 22c by the first fluid passage 23 and the pistons 13 and 16 move forward toward the disc rotor in the cylinder holes 9 and 11 to brake the front wheel. If the brake lever 33 for the rear wheel is operated, fluid pressure generated in the second fluid pressure master cylinder 34 is introduced into the fluid pressure chambers 22b by the second fluid passage 24 and the piston 19 moves forward toward the disc rotor in the cylinder hole 10 to brake the front wheel and the disc brake 35 for the rear wheel is actuated to brake the rear wheel.

In the present embodiment, as described above, the communication path 23a and the first bleeder hole 6o are formed simultaneously by boring them from the opening portion of the first bleeder hole 6o to a face, on the disc rotation output side, of the cylinder hole 11 through the cylinder hole 13 and then the internal thread portion is formed in the opening portion of the first bleeder hole 6o. Therefore, the number of man-hours for machining can be reduced and the cost can be reduced. The communication path 23a is formed rectilinearly on the outside, in the disc radius direction, of the imaginary line IL1 which rectilinearly connects the inner edges, in the disc radius direction, of the cylinder hole 9 on the disc rotation output side and the cylinder hole 11 on the disc rotation input side and the central cylinder hole 10 for the second brake system is provided on the outside, in the disc rotor radius direction, of the communication path 23a. As a result, it is possible to reduce the caliper body 6 in size without impairing the air bleeding property in the cylinder holes 11 and 13 in the mounted state to the vehicle body in which the first bleeder hole 6o is facing upward.

The slide pin 5 on the disc inner periphery side is disposed at such a position that the imaginary line IL2 which rectilinearly connects inner edges, in the disc radius direction, of cylinder portions 6r and 6s of the caliper body 6 having, inside themselves, the cylinder hole 9 on the disc rotation output side and the cylinder hole 11 on the disc rotation input side passes through the section of the slide pin 5. As a result, the mounting arm of the slide pin 5 does not protrude greatly inward in the disc radius direction unlike in the prior art and it is possible to further reduce the caliper body 6 in size.

Figure 8:
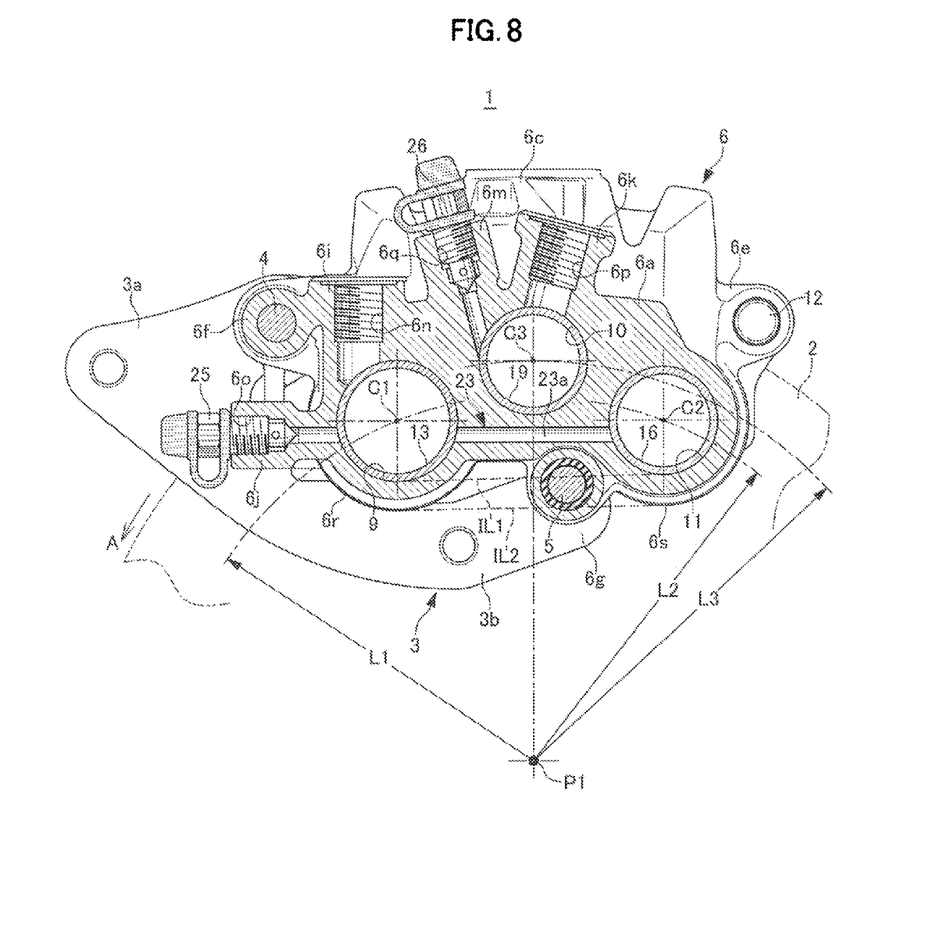
FIG. 8 is a cross-sectional view of another embodiment of the invention.

The present invention is not limited to the above-described embodiment. The slide pin on the disc inner periphery side may be disposed on the outside, in the disc radius direction, of the imaginary line which linearly connects the inner edges, in the disc radius direction, of the cylinder portions of the caliper body having, in themselves, the cylinder hole on the disc rotation output side and the cylinder hole on the disc rotation input side. This embodiment is illustrated in FIG. 8. Furthermore, the invention is not limited to one having the three cylinder holes in the action portion and may be applied to one including four or more cylinder holes. Diameters and depths of the cylinder holes may be arbitrary diameters and depths and the respective union holes and the second bleeder hole may be formed properly according to shapes of the cylinder holes and the caliper body. Furthermore, each of the fluid pressure master cylinders may be one which generates fluid pressure by operation of a brake pedal. Alternatively, a connecting means such as a wire may be pulled by operation of a brake operating element to generate fluid pressure in a fluid pressure master cylinder.

EXPLANATION OF REFERENCE NUMERALS

1 . . . disc brake, 2 . . . disc rotor, 3 . . . caliper bracket, 4, 5 . . . slide pin, 6 . . . caliper body, 6a . . . action portion, 6b . . . reaction portion, 6c . . . bridge portion, 6d . . . reaction force claws, 6f, 6g . . . mounting arm, 6h . . . protruding portion, 6i . . . first union boss portion, 6j . . . first bleeder boss portion, 6k . . . second union boss portion, 6m . . . second bleeder boss portion, 6n . . . first union hole, 6o . . . first bleeder hole, 6p . . . second union hole, 6q . . . second bleeder hole, 6r . . . cylinder portion, 6s . . . cylinder portion, 7, 8 . . . friction pads, 7a, 8a . . . lining, 7b, 8b . . . back plate, 7c, 8c . . . arm portion, 7d, 8d . . . torque transmitting arm, 8e . . . bifurcated chip, 9, 10, 11 . . . cylinder hole, 9a, 10a, 11a . . . piston seal groove, 9b, 10b, 11b . . . dust seal groove, 12 . . . hanger pin, 13, 16, 19 . . . piston, 14, 17, 20 . . . piston seal, 15, 18, 21 . . . dust seal, 22a, 22b, 22c . . . fluid pressure chamber, 23 . . . first fluid passage, 23a . . . communication path, 24 . . . second fluid passage, 31, 33 . . . brake lever, 32 . . . first fluid pressure master cylinder, 34 . . . second fluid pressure master cylinder, 35 . . . disc brake.

The invention claimed is:

1. A caliper body for a disc brake for a vehicle, the caliper body being for a two system-type disc brake for the vehicle and comprising:

three or more cylinder holes arranged in a disc circumference direction in an action portion disposed at a side portion of a disc rotor, at least two of the cylinder holes being formed as cylinder holes for a first brake system and at least one of the cylinder holes being formed as a cylinder hole for a second brake system, the at least one cylinder hole for the second brake system being disposed between the at least two cylinder holes for the first brake system, the at least two cylinder holes for the first brake system being connected by a communication path, pistons inserted into the at least two cylinder holes for the first brake system being actuated by hydraulic fluid supplied through a first fluid passage, a piston inserted into the at least one cylinder hole for the second brake system being actuated by hydraulic fluid supplied through a second fluid passage, a first union hole and a first bleeder hole open in the first fluid passage, and a second union hole and a second bleeder hole open in the second fluid passage, wherein the communication path and the first bleeder hole are formed rectilinearly on an outside, relative to a center of the disc brake in a disc radius direction, of an imaginary line which rectilinearly connects inner edges, relative to the center of the disc brake in the disc radius direction, of the at least two cylinder holes for the first brake system, wherein the at least one cylinder hole for the second brake system is provided on an outside, relative to the center of the disc brake in the disc radius direction, of the communication path, wherein the caliper body is supported to be movable in a direction of a disc shaft on a caliper bracket mounted to a vehicle body through a pair of slide pins, one of said slide pins being provided on a disc rotation output side and the other of said slide pins being provided on a disc inner periphery side in a forward traveling direction of the vehicle, and wherein the slide pin on the disc inner periphery side is either (a) disposed at such a position that an imaginary line which rectilinearly connects inner edges of cylinder portions having the at least two cylinder holes for the first brake system formed therein, relative to the center of the disc brake in the disc radius direction, passes through a section of the slide pin, or (b) disposed on an outside of the imaginary line, relative to the center of the disc brake in the disc radius direction.

2. A caliper body for a disc brake for a vehicle, the caliper body being for a two system-type disc brake for the vehicle and comprising:

three cylinder holes arranged in a disc circumference direction in an action portion disposed at a side portion of a disc rotor, two of the cylinder holes disposed on a disc rotation input side and a disc rotation output side in a forward traveling direction of the vehicle being formed as cylinder holes for a first brake system and the central cylinder hole being formed as a cylinder hole for a second brake system, the two cylinder holes for the first brake system being connected by a communication path, pistons inserted into the cylinder holes for the first brake system being actuated by hydraulic fluid supplied through a first fluid passage, the piston inserted into the cylinder hole for the second brake system being actuated by hydraulic fluid supplied through a second fluid passage, a first union hole and a first bleeder hole open in the first fluid passage, and a second union hole and a second bleeder hole open in the second fluid passage, wherein the caliper body includes the action portion disposed at one side portion of the disc rotor, a reaction portion disposed on the other side portion of the disc rotor, and a bridge portion connecting the reaction portion and the action portion astride an outer periphery of the disc rotor, wherein the communication path and the first bleeder hole are formed rectilinearly on an outside, relative to a center of the disc brake in a disc radius direction, of an imaginary line which rectilinearly connects inner edges, relative to the center of the disc brake in the disc radius direction, of the two cylinder holes for the first brake system, wherein the cylinder hole for the second brake system is provided on an outside, relative to the center of the disc brake in the disc radius direction, of the communication path, wherein the caliper body is supported to be movable in a direction of a disc shaft on a caliper bracket mounted to a vehicle body through a pair of slide pins, one of said slide pins being provided on a disc rotation output side and the other of said slide pins being provided on a disc inner periphery side in a forward traveling direction of the vehicle, and wherein the slide pin on the disc inner periphery side is either (a) disposed at such a position that an imaginary line which rectilinearly connects inner edges of cylinder portions having the two cylinder holes for the first brake system formed therein, relative to the center of the disc brake in the disc radius direction, passes through a section of the slide pin, or (b) disposed on an outside of the imaginary line, relative to the center of the disc brake in the disc radius direction.

3. The caliper body according to claim 1, wherein the slide pin on the disc inner periphery side is disposed such that the imaginary line which rectilinearly connects the inner edges of the cylinder portions having the at least two cylinder holes for the first brake system formed therein, relative to the center of the disc brake in the disc radius direction, passes through the section of the slide pin.

4. The caliper body according to claim 1, wherein the slide pin on the disc inner periphery side is disposed on the outside of the imaginary line which rectilinearly connects the inner edges of the cylinder portions having the at least two cylinder holes for the first brake system formed therein, relative to the center of the disc brake in the disc radius direction.

5. The caliper body according to claim 2, the slide pin on the disc inner periphery side is disposed such that the imaginary line which rectilinearly connects the inner edges of the cylinder portions having the two cylinder holes for the first brake system formed therein, relative to the center of the disc brake in the disc radius direction, passes through the section of the slide pin.

6. The caliper body according to claim 2, wherein the slide pin on the disc inner periphery side is disposed on the outside of the imaginary line which rectilinearly connects the inner edges of the cylinder portions having the two cylinder holes for the first brake system formed therein, relative to the center of the disc brake in the disc radius direction.

* * * * *